(12) United States Patent
Alamineh

(10) Patent No.: US 6,914,877 B1
(45) Date of Patent: Jul. 5, 2005

(54) SYSTEM FOR ALERTING A NETWORK OF CHANGES IN OPERATIONAL STATUS OF COMMUNICATION LINKS

(75) Inventor: Debebe A. Alamineh, Eatontown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/410,249

(22) Filed: Sep. 30, 1999

(51) Int. Cl.[7] ................................................. H04J 1/16
(52) U.S. Cl. ...................... 370/217; 370/225; 370/237; 370/248; 370/352; 370/400
(58) Field of Search ................................. 370/216–228, 370/230–238, 248, 352–356, 400, 450, 389, 252, 254, 255, 312, 242

(56) References Cited

U.S. PATENT DOCUMENTS

| | | | | |
|---|---|---|---|---|
| 4,864,559 A | * | 9/1989 | Perlman ...................... 370/256 |
| 5,003,533 A | * | 3/1991 | Watanabe .................... 370/258 |
| 5,128,926 A | * | 7/1992 | Perlman et al. ............. 370/248 |
| 5,251,205 A | * | 10/1993 | Callon et al. ................ 370/392 |
| 5,412,654 A | * | 5/1995 | Perkins ........................ 370/312 |
| 5,995,503 A | * | 11/1999 | Crawley et al. ............. 370/351 |
| 6,147,971 A | * | 11/2000 | Rochberger et al. ......... 370/238 |
| 6,308,282 B1 | * | 10/2001 | Huang et al. ................... 714/4 |

* cited by examiner

*Primary Examiner*—Frank Duong
*Assistant Examiner*—Melanie Jagannathan

(57) ABSTRACT

A system for informing nodes in a network of the operational status of links. Each node examines the links connected to it. When a change in status is detected, the node records the change, and informs its neighbors. The neighbors receive the information, record the change, and inform their neighbors. Those neighbors receive the information, record the change, inform their neighbors and the process continues. To prevent the process from continuing forever, specific termination steps are taken. Under the system, each node is equipped with up-to-date information as to the available links within the network. The nodes utilize that information in routing data packets from node to node.

20 Claims, 9 Drawing Sheets

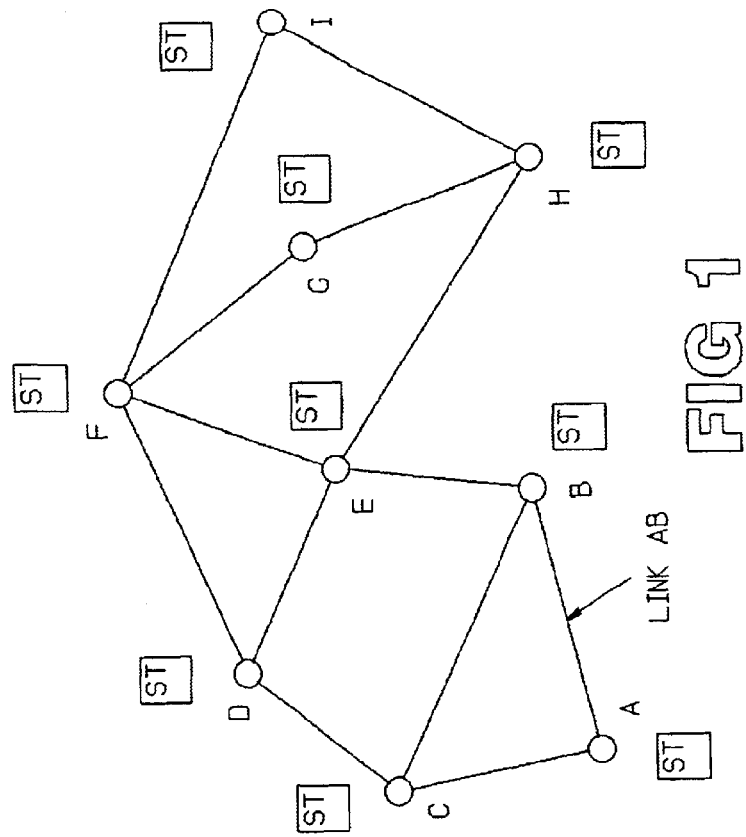

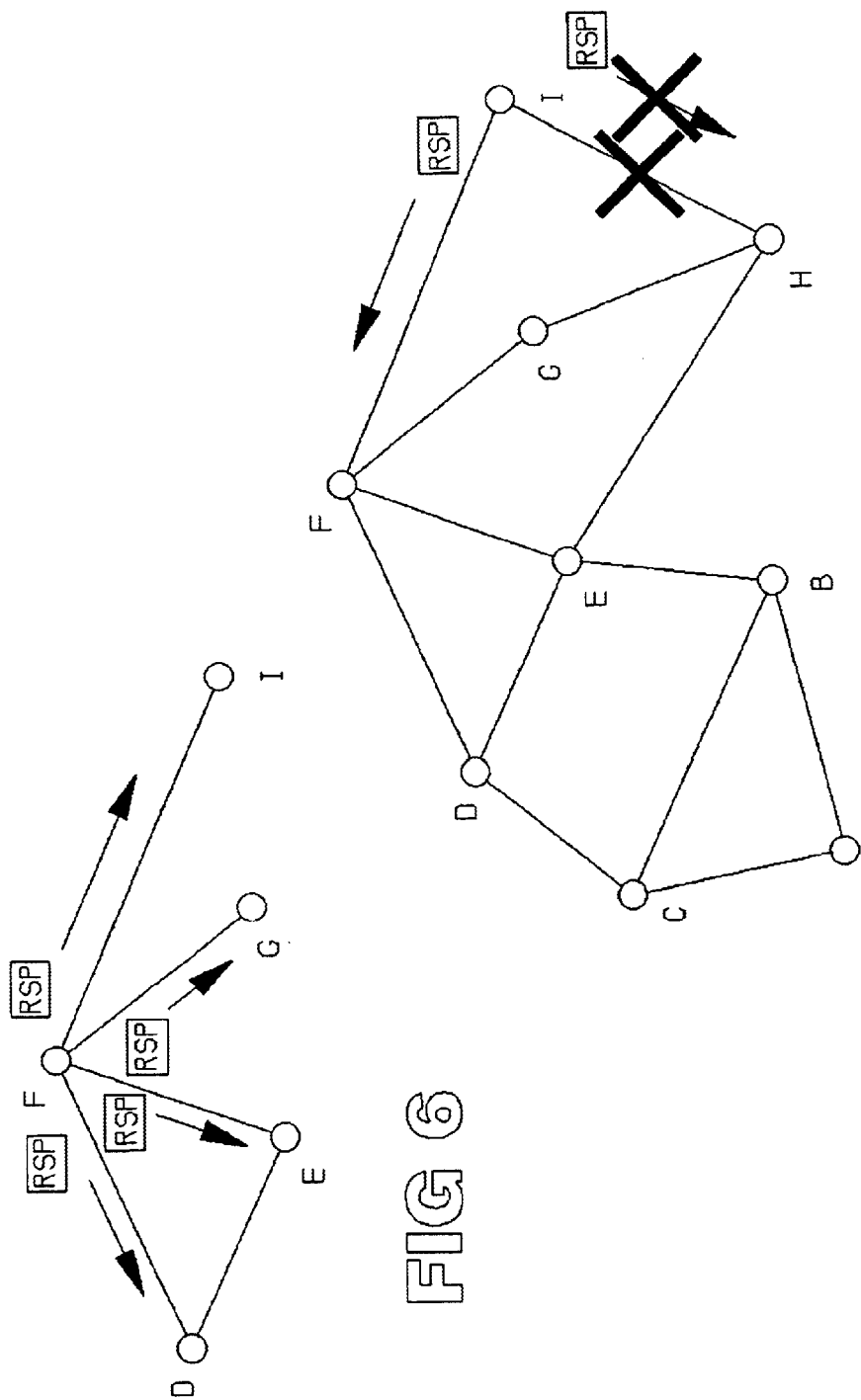

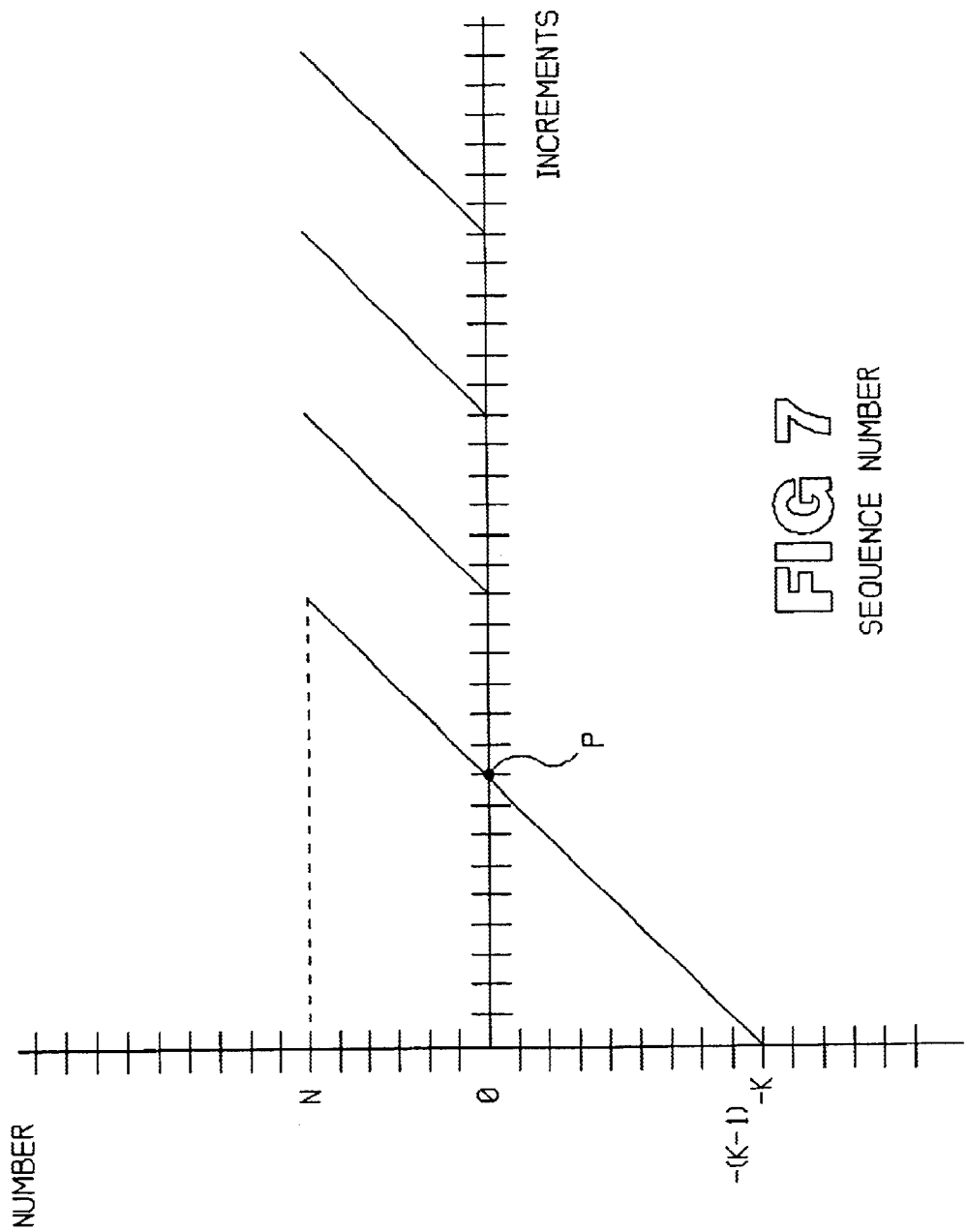

FIG 8A

| | INCOMING RSP | STORED RSP | ACTION TAKEN |
|---|---|---|---|
| AGE | >0 | 0 | ACCEPT INCOMING |
| SEQUENCE No. | | | |
| CONTENT | | | |

FIG 8B

| | INCOMING RSP | STORED RSP | ACTION TAKEN |
|---|---|---|---|
| AGE | | | ACCEPT INCOMING |
| SEQUENCE No. | >X | X | |
| CONTENT | | | |

FIG 8C

| | INCOMING RSP | STORED RSP | ACTION TAKEN |
|---|---|---|---|
| AGE | SAME | SAME | DISCARD INCOMING |
| SEQUENCE No. | SAME | SAME | |
| CONTENT | SAME | SAME | |

FIG 8D

| | INCOMING RSP | STORED RSP | ACTION TAKEN |
|---|---|---|---|
| AGE | | | DISCARD INCOMING |
| SEQUENCE No. | SAME | SAME | |
| CONTENT | X | DIFF | |

FIG 8E

| | INCOMING RSP | STORED RSP | ACTION TAKEN |
|---|---|---|---|
| AGE | 0 | | ACCEPT INCOMING |
| SEQUENCE No. | SAME | SAME | |
| CONTENT | | | |

FIG 8F

| | INCOMING RSP | STORED RSP | ACTION TAKEN |
|---|---|---|---|
| AGE | | | DISCARD INCOMING PROPAGATE COPY FROM TABLE |
| SEQUENCE No. | NEGATIVE | | |
| CONTENT | | | |

FIG 8G

| INCOMING RSP | STORED RSP | ACTION TAKEN |
|---|---|---|
| AGE | | |
| SEQUENCE No. | | ISSUE FRESH RSP |
| CONTENT | | |
| OTHER | RECIPIENT WAS ORIGINATOR | |

FIG 8H

| INCOMING RSP | STORED RSP | ACTION TAKEN |
|---|---|---|
| AGE | | |
| SEQUENCE No. | X | ISSUE FRESH RSP |
| CONTENT | | W/X + 1 AS SEQ. NO. |
| OTHER | RECIPIENT WAS ORIGINATOR AND SEQ. NO. OF LAST WAS NEG. | |

FIG 8I

| INCOMING RSP | STORED RSP | ACTION TAKEN |
|---|---|---|
| AGE | 0 | |
| SEQUENCE No. | | ISSUE FRESH RSP |
| CONTENT | | |
| OTHER | RECIPIENT WAS ORIGINATOR AND SEQ. NO. OF LAST WAS NEG. | |

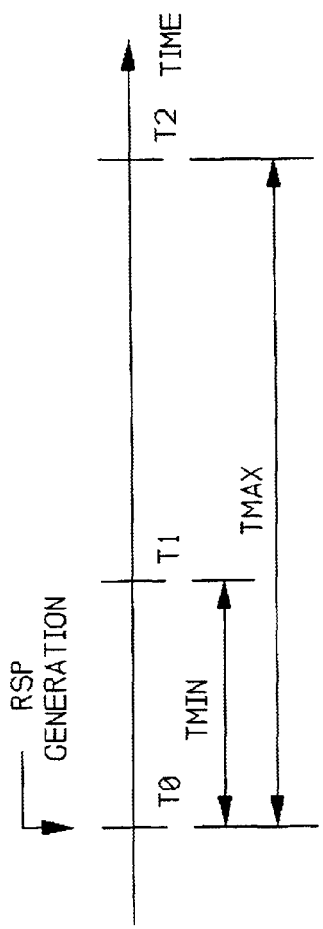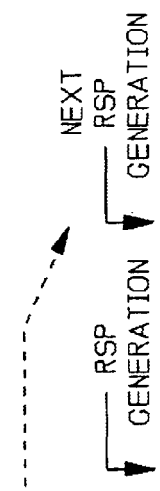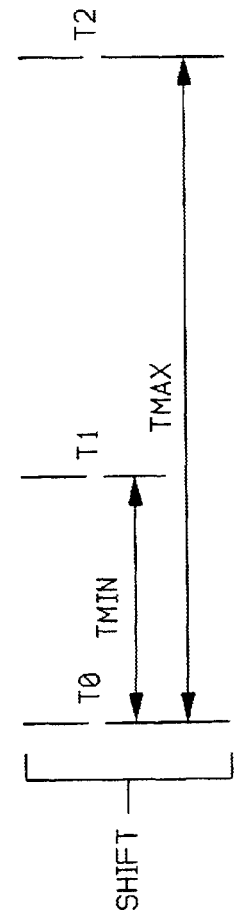
FIG 9

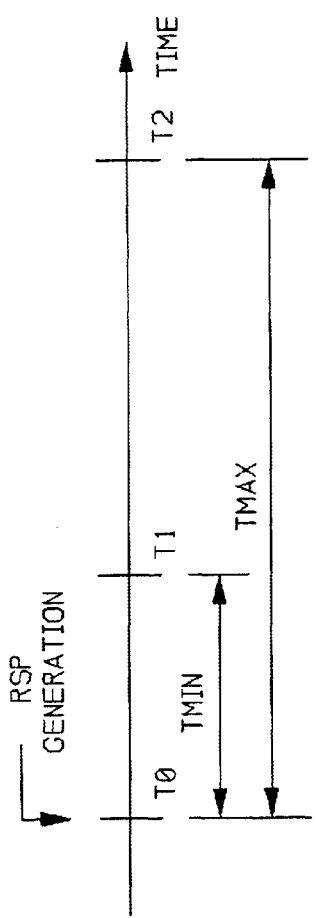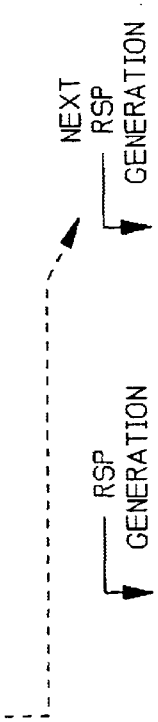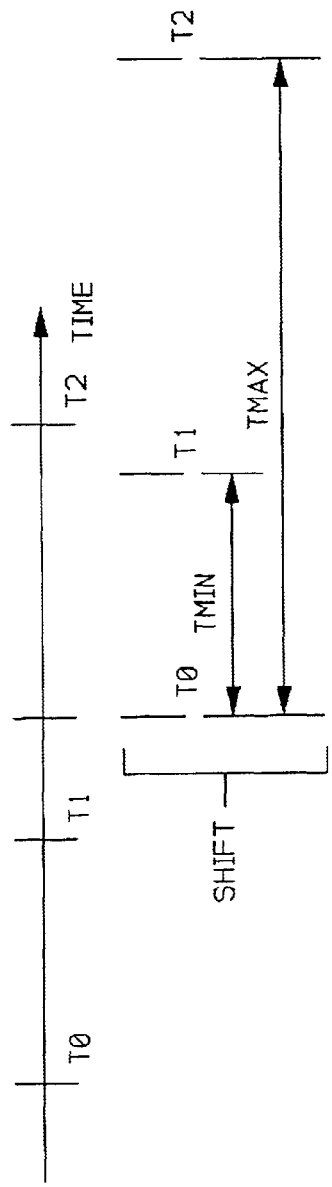
FIG 10
1. IF EVENT OCCURS WITHIN TMIN, WAIT UNTIL T1 TO ISSUE RSP. SHIFT T0 TO T1.
2. RULE 6B. IF EVENT OCCURS BETWEEN T1 AND T2, ISSUE RSP IMMEDIATELY. SHIFT T0 TO EVENT.
3. IF NO EVENT OCCURS, ISSUE PERIODIC RSP AT T2.

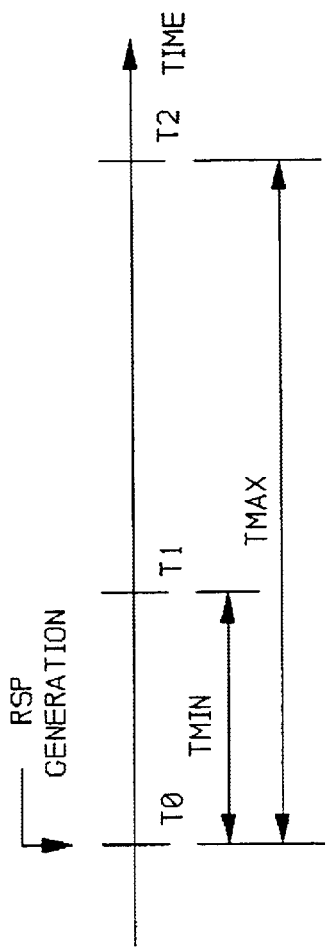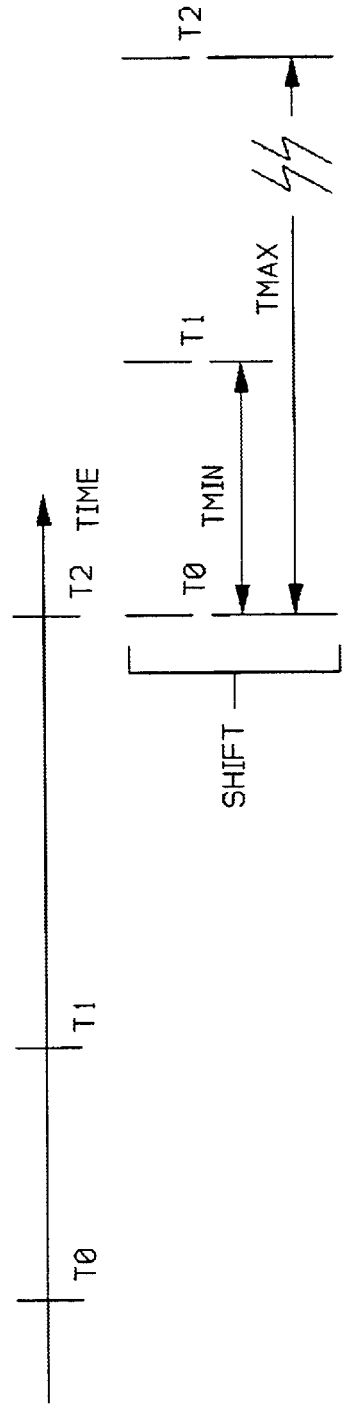
FIG 11
1. IF EVENT OCCURS WITHIN TMIN, WAIT UNTIL T1 TO ISSUE RSP. SHIFT T0 TO T1.
2. IF EVENT OCCURS BETWEEN T1 AND T2, ISSUE RSP IMMEDIATELY. SHIFT T0 TO EVENT.
3. RULE 6C. IF NO EVENT OCCURS, ISSUE PERIODIC RSP AT T2. SHIFT T0 TO T2.

SYSTEM FOR ALERTING A NETWORK OF CHANGES IN OPERATIONAL STATUS OF COMMUNICATION LINKS

The invention concerns detection of change in status of communication links within a network, and informing the nodes within the network of that change.

BACKGROUND OF THE INVENTION

As packet-switched networks, such as the Internet, come into wider use, they are being utilized to carry other information beside data, such as telephone traffic.

In industrialized countries, telephone systems have become extremely reliable, and people have come to demand this high reliability as a norm. When they use the Internet to carry telephone calls, they expect similar reliability. However, the Internet has not yet developed this level of reliability, partly because of its youthful age.

In addition, while both telephone systems and the Internet utilize similar methodologies and equipment, they nevertheless represent fundamentally different technologies. As a result, the technical features of a modern telephone network which are responsible for its high reliability are, in general, not directly transferable to the Internet.

Consequently, a need exists to improve the reliability of packet-switched networks, such as the Internet.

SUMMARY OF THE INVENTION

In a packet-switched network generally, "nodes" transmit data packets between themselves over "links," which are communication channels. In one form of the invention, each node monitors the health of links connecting to it. When a change in health is detected, the node floods the network with messages carrying news of the change. When other nodes learn of the change, they modify their routing of data packets to accommodate the change.

In addition, procedures are implemented to terminate the flooding at an appropriate time.

BRIEF DESCRIPTION OF THE DRAWINGS

FIG. 1 illustrates a generalized network.

FIG. 2 illustrates a status table describing the health of the links of the network of FIG. 1.

FIGS. 5 and 6 illustrate flooding of a network.

FIG. 7 illustrates one approach for assigning sequence numbers to packets which flood the network, informing nodes of a change in status of a link.

FIGS. 8A, 8B, 8C, 8D, 8E, SF, 8G, 8H, and 8I illustrate graphically several rules which the invention implements.

FIGS. 9, 10, and 11 illustrate time limits placed on the generation of the packets which flood the network.

DETAILED DESCRIPTION OF THE INVENTION

Overview

Figures 3, 4:
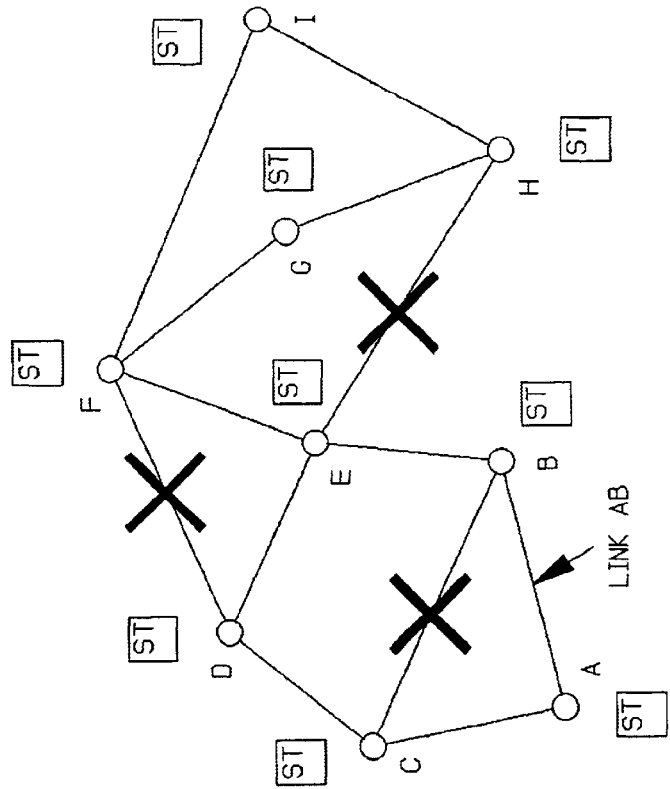
FIG. 3 illustrates the network of FIG. 1, but with three links designated as inoperative.
FIG. 4 illustrates a status table describing the health of the links of the network of FIG. 3.

In a packet-switched network, each node computes a route for the data packets which it originates. The route indicates which "links" the packet is to follow. However, links malfunction. When that occurs, a link ceases to be available to carry packets.

Each node monitors the links adjacent to it. When a change in status is detected, the node modifies the routes which it subsequently computes, to accommodate the change. In addition, the node tells its neighbors of the change, and they similarly modify their computations. They also tell their neighbors, who modify their computations, and so on. Eventually, all nodes learn of the change, and modify their routing computations.

While this basic procedure is easy to state, several significant technical problems arise in its implementation. The invention resolves, or minimizes, many of the problems.

Detailed Description

Background and Terminology on Packet-Switched Networks

FIG. 1 illustrates a generalized network. It contains nodes, which are the circles labeled A through I. Each node contains one, or more, computers which handle data traffic entering, and leaving, the node. The nodes are connected by links, such as link AB. The links are labeled by reference to the two nodes which it connects. For example, link AB connects nodes A and B. Each link is a data-transmission channel, and allows the nodes which it connects to transmit data packets between themselves.

Each node is equipped with a status table ST, such as that shown in FIG. 2. The status table indicates the operability of each link in the network. The data is organized node-by-node, beginning with node A in this example. The links connecting to each node are listed in the LINK column, and the status of each link is indicated in the STATUS column. In this example, a "Y" is given for each link, meaning "yes," or operative.

Each node ascertains the status of the links connected to it. For example, node A is responsible for ascertaining status of links AB and AC. To do this, node A may send a test packet to node B. The test packet requests that it be returned to node A. If node A fails to receive the returned packet within a specified time, node A concludes that the link AB is inoperative.

The status table, as shown, is redundant. Each link is listed twice: link AB is associated with node A, and listed as AB. That same link is also associated with node B, and listed as BA. The redundancy can be eliminated, and approaches for doing so are known in the art. For simplicity, this discussion will presume that redundancy exists.

FIG. 3 illustrates the network of FIG. 1, but with a combination of defective nodes, which are indicated by the crosses. FIG. 4 indicates how the status table would read in such a case. The defective nodes are labeled "N," meaning "no," and are highlighted by the arrows. A FLAG column has been added, and will be discussed later. The nodes utilize the status table in computing how packets are to be routed from origin to destination. For example, in FIG. 1, if node A wishes to transmit a packet to node H, that packet may be routed successively through nodes B, E, and then H: the path would be A-B-E-H.

In general, selection of a route is based on characteristics of links and nodes which are not shown in the status table. For example, different links, in general, will require different transit times to traverse. Similarly, different nodes will present different delays from the entry point to the exit point, especially if congested. The algorithm choosing a route considers these factors, and attempts to minimize a specific parameter, such as time delay. In other cases, monetary cost can be minimized.

Each node computes a route for the packets which it originates, using algorithms known in the art. The computed route is included within the packet, and the originating node transmits the packet to the first node indicated in the route. When that node receives the packet, it examines the route, and routes the packet accordingly.

Other approaches to routing can be used, such as "next hop" routing, wherein an originating node merely specifies a destination node, but does not compute a path. No route is included within the node. Each node, including the originating node, is equipped with a "next hop" routing table, which specifies, for each destination, a preferred "next hop," which is another node. The node holding the packet routes the packet to its next-hop-node for the packet's destination. That next-hop-node routes the packet to a next-next-hop-node for that destination, and so on.

Status Tables are Not Constant

In the general case, the status tables ST of FIG. 2 will change over time. Consequently, the routes selected by the routing algorithms will change as the status tables change, because the legs available for routes will change. For example, the route A-B-E-H, described above, cannot be used in the situation of FIG. 3: the hop, or link, E-H is not available.

In theory, an omniscient administrator of the network could detect all changes in status of links, and immediately update all status tables. However, in practice, immediate updating is not possible, at least because time is required to (1) identify faulty links, and (2) inform the status tables about those faults.

The invention provides an approach for rapidly informing the nodes of changes in status of a link, and for rapidly apprising the nodes of subsequent changes in that status.

Operation of Invention

Under the invention, each node examines its links, as by utilizing the test packets described above, or in another manner. When a node discovers that a link has changed in status, as from operative to inoperative, it floods the network with that information.

FIGS. 5 and 6 illustrate flooding. Assume that node I discovers link IH to be defective. In response, node I transmits a data packet, termed a Route Status Packet, RSP, to every node connected to it. The RSP identifies its originator, contains a checksum for error correction, and contains other data, identified below. In this example, the only node connected is node F, because the link to node H is defective. Thus, the RSP is transmitted to node F, and no RSP is transmitted along link IH, as indicated by the crosses.

Node F accepts the RSP, updates its status table, and passes the RSP along to all nodes connected to node F, as indicated in FIG. 6. Two possible options arise at this point: node F may, or may not, return the RSP to node I, the originator. Either option may be taken, depending upon how much bandwidth of the network is desired to be consumed by the flooding process.

The process continues: every node receives the RSP, updates its status table, and passes the RSP along to all its neighbors. The updated status tables will be used by the routing algorithms of the nodes to compute new routes.

This ostensibly simple procedure faces several technical challenges in implementation. For example, if the procedure just described were followed literally, it would continue forever: the flooding would never terminate. That is not desirable.

The following rules are implemented by the invention. These rules overcome, or reduce the significance of, many of the technical challenges. These rules both create and terminate the flooding. They also (1) suppress errors within RSPs and (2) facilitate transitions when a link, or node, either enters, or leaves, service.

Rule 1. As soon as a node receives an RSP which indicates that status of a link has changed, it takes the following actions, not necessarily in the order listed:

Rule 1(A). The node, termed a "notified node" updates its status table.

Rule 1(B). The notified node computes a new routing table.

Rule 1(C). The notified node suspends transmission of packets to nodes which (i) are connected to the failed link and (ii) would relay the packets across the failed link. Such nodes are called "affected nodes." The notified node instead stores, or queues, the packets. The notified node can be an affected node.

FIG. 3 provides an example of affected nodes. Node D would be an affected node for packets which it receives, and which would be transmitted along failed link DF. However, that node D would not be an affected node for packets which it receives, and which would be transmitted along link DE, which is operational.

Rule 1(D). The notified node routes packets as usual to nodes other than affected nodes.

Rule 1(E). When the notified node completes computation of the new routing table, using the updated status table, it implements the new table. The queue which was created because of Rule 1(C), above, is gradually emptied, using the new routing table.

Rule 1(F). The notified node transmits the RSP to its neighbors. They undertake the steps outlined above. In practice, the step of Rule 1(F) would be taken immediately after receipt of the RSP.

During this process, it is possible that some packets are lost. For example, assume that the failed link EH in FIG. 3 takes the form of a standard telephone cable, running between two towns. Assume that an automobile accident breaks the cable. At that instant, some bits will be travelling on the cable, and will be lost. Also, the transmitting node may continue to transmit packets after the breakage. Those transmitted packets will be lost.

These losses are handled by standard error-correction procedures. For example, the transmitting node, say node H in FIG. 3, informs the receiving node, node E, of the number, and identity, of packets which will be received. If node E fails to receive the expected packets, it requests re-transmission. The re-transmission occurs after the node EH becomes repaired.

These particular error-correction procedures are not a focus of the invention, but are mentioned for completeness. Other error-correction procedures are possible.

Rule 2. When a notified node receives an RSP indicating that a failed link has been repaired, the notified node updates its status table, computes a new routing table, and begins using it. The notified node also informs its neighbors, using the flooding process described above. They also update their status tables, calculate new routing tables, and begin using them.

It is possible that the queues of Rule 1(C) have not been emptied at this time. That situation is handled by rules given below.

Rule 3. Unless countermeasures are taken, the flooding described above will continue forever. The following rules suppress, or reduce, flooding, and also cause several desirable effects, which are explained later.

Rule3(A) Each RSP is assigned a sequence number by its originating node. That sequence number remains attached to the RSP during its lifetime. The sequence number, in effect, indicates how many RSPs the given node has issued since becoming operational. For example, the RSP generated by a node after the node's 5th RSP will be given a sequence number of 6.

The sequence numbers are assigned in a particular way, as the following two rules indicate.

Rule 3(A)(i). When a node first becomes operational, as when it first comes on-line, or comes on-line after having malfunctioned, it assigns the first RSP issued the sequence number −K, which is shown in FIG. 7. The sequence number for the next RSP is −(K−1), as indicated, and so on.

The specific sequence is −K, −(K−1), −(K−2) . . . −1, 0, 1, 2, . . . (n−1), n, 0, 1, 2, . . . (n−1), n, 0, 1, 2, . . . . This sequence creates a linear section from (−K) to zero, and then repeating linear sections after zero, that is, after point P in FIG. 7.

K and N are integers, of maximum value 2**16 each. Of course, given these values, the actual sizes of K and n are not shown in FIG. 7. The effects of this particular assignment of sequence numbers will be explained below.

The sequence number remains with an RSP throughout its life, and does not change.

Rule 3(A)(ii). A node never assigns a sequence number greater than MAX_AGE/2 to a packet. MAX_AGE is the maximum allowable age of a packet, and is explained immediately below.

Rule 3(B). When an RSP is generated, it is given an age, namely, MAX_AGE. That age is incrementally decremented.

Rule 3(B)(i). It is decremented by one age unit whenever it experiences a hop, which is transmission on a link from one node to another.

Rule 3(B) (ii). It is decremented by one age unit whenever it is stored for a specific period of time in a node's database, such as in a queue.

That period of time is discussed below.

One purpose of the maximum age MAX_AGE is to extinguish ancient packets, which are assumed to contain stale data. Extinguishment is discussed below.

Rule 4. Error correction is undertaken, to discard packets which appear to contain incorrect data.

Rule 4A). An error correction code, ECC, such as a checksum, is generated from specific data within an RSP, such as its sequence number. This ECC is generated only upon creation of the RSP, and not upon relay by other nodes, as occurs during flooding. Discarding of erroneous RSPs is described below.

Rule 5. This rule concerns how RSPs are handled when received. As background, the following procedures are set forth:

Whenever a node propagates an RSP, the age of an RSP is decremented by unity, but not below zero. The decrementing could also be done upon receipt, rather than propagation, with minor modification to the procedures described herein.

Whenever an RSP reaches its originator in the flooding process, it is discarded.

Whenever an RSP is received, it is compared with the stored RSP within the recipient's status table which was received from the same transmitting node. For example, a received RSP from node E would be compared with the entry labeled RSP_E in FIG. 2. It would not be compared with entry labeled RSP_G.

Rule 5(A). If an incoming RSP has an age greater than zero, and the stored RSP has age zero, then the incoming RSP is accepted. FIG. 8A illustrates the situation. "Acceptance" means replacing the stored RSP with the incoming RSP, and propagating, or flooding, the incoming RSP to neighboring nodes. As stated above, the propagated RSP retains its original sequence number, but its age is decremented by one age unit.

Rule 5(B). If an incoming RSP has a sequence number exceeding that of the stored RSP, the incoming RSP is accepted. If not, the incoming RSP is discarded. FIG. 8B applies.

"Discarding" means that the receiving node destroys the incoming RSP, and does not propagate it, of flood it. Of course, that discarding process does not completely eliminate the RSP, because other copies may exist within the network.

This step causes later-issued RSPs to replace earlier-issued RSPs, which are stored in a status table. However, this step may result in rejection of an incoming RSP containing correct link-status data, but which bears an incorrect sequence number. For example, an error may have changed the sequence number of an incoming RSP, causing it to appear older than it is.

This rejection is tolerated, on the grounds that this particular RSP will expire no later than MAX_AGE from the rejection. At that time, accurate RSPs will arise which will be accepted. These occurrences are further explained later.

Rule 5(C). If an incoming RSP is identical to the stored RSP, the incoming RSP is discarded. FIG. 8C applies.

Rule 5(D). If the sequence number of an incoming RSP is the same as that of the stored RSP, but the "content" of the RSPs are different, the incoming RSP is discarded. FIG. 8D applies. "Content" refers to information regarding link status.

Rule 5(E). If the age of the incoming RSP is zero, the RSP is accepted. FIG. 8E applies. This step cooperates with that of Rule 5(I), below. The acceptance of this step causes an RSP of zero age to be propagated. When the originator receives this RSP, the originator recognizes this zero-age RSP, and issues a fresh RSP, under Rule 5(I).

Rule 5(F). If an incoming RSP bears a negative sequence number, that is, from −K to zero in FIG. 7, the receiving node takes two actions. One, it discards the incoming RSP. Two, it propagates a copy of the last RSP received from the originator of the discarded RSP. The copy is contained in the recipient's status table. FIG. 8F applies. This step cooperates with that of Rule 5(G), below.

Rule 5(G). This rule cooperates with Rule 5(F). The originator will eventually receive the copy issued under Rule 5(F). As indicated in FIG. 8G, the originator recognizes that its RSP has expired. It discards the incoming RSP, and issues a fresh RSP, which indicates current status of its links.

Rule 5(H). When (1) a node receives an incoming RSP which indicates that the node was the originator of the RSP, and (2) the sequence number of the last RSP issued by the node was negative, the node discards the incoming RSP and issues a fresh RSP having a sequence number of X+1. "X" is the sequence number of the incoming RSP, and was assigned to the RSP by Rule 5(F), as in FIG. 8(F). This step occurs when the receiving node is a newly activated node, and causes the node to acquire a correct sequence number, as in FIG. 8(H).

Rule 5(I). As discussed above, when an originator receives its own RSP, and the sequence number of the last RSP was negative, the originator issues a fresh RSP. FIG. 8I applies.

Rule 6. This rule governs timing of RSP issuance. The RSPs can be classified into two types: "event-induced" and "periodic." Event-induced RSPs are issued when a change in status of a link is detected. Periodic RSPs are issued at a specified time after issuance of a previous RSP, even if no change in status has occurred. Reasons for issuing periodic RSPs are given below.

FIGS. 9–11 contain graphical representations of the three following rules. In FIG. 9, top, issuance of a reference RSP occurs at time T0, which is a reference time.

Rule 6(A). If a change in status of a link occurs within TMIN of T0, wait until T1 to issue the event-induced RSP.

Rule 6(B). If a change in status of a link occurs after T1, but before T2, issue the event-induced RSP immediately.

RULE 6(C). If no change in status occurs, issue an RSP at T2.

In all cases, reset time T0 to the time of issuance of the RSP.

FIG. 9 illustrates Rule 6(A). The RSP is issued at time T1, and the reference time T0 is then shifted to time T1. The rules are then re-applied for the next RSP, using the shifted T0.

FIG. 10 illustrates Rule 6(B). The RSP is generated between times T1 and T2. The reference time T0 is shifted to the time of the RSP. The rules are then re-applied for the next RSP, using the shifted T0.

FIG. 11 illustrates Rule 6(C). No change in link status occurred, so no event-induced RSPs occurred. A periodic RSP is issued at time T2. It indicates the current status of the links at the issuing node. The reference time T0 is shifted to that time. The rules are then re-applied for the next RSP, using the shifted T0.

Rule 7. When a failed link is repaired, the affected nodes, which are those directly connected to the link, will be the agents which detect the change in status of the link. Those nodes each originate an RSP reporting the change in status. As the other nodes receive the RSP, or its copies, they follow Rules 5(A) 5(I).

However, a problem can arise because of buffered packets. (Buffered packets are not RSPs, but the data packets ordinarily transmitted over the network.) As explained above, packets intended for affected nodes were queued. Perhaps those queues were emptied, by routing the queued packets around the failed node. But, in the general case, non-emptied queues, containing queued packets, must be expected in nodes.

It is possible that, after repair of the failed link, new traffic may be transmitted over the link prior to those queued packets. That is not desirable: the queued packets should arrive first. Consequently, a timer of duration TTR is set, and allowed to run out. While the timer runs, the affected nodes accept incoming packets, but queue them, and do not transmit them over the now-repaired link. Instead, during that time, the affected nodes empty their queues of packets received prior to repair of the link. After the timer runs out, the affected nodes begin emptying their queues of newly arrived packets.

Rule 8(A). No node will issue an RSP having a sequence number greater than M+n/2 before the RSP bearing sequence number M expires of old age. The parameter "n" is defined in FIG. 7. Restated, if an RSP having a sequence number of M exists, no node will issue an RSP having a sequence number exceeding M+n/2. "No node" includes all nodes.

Rule 8(B). The quotient n/2 exceeds the quotient MAX_AGE/TMAX. FIG. 10 shows TMAX. MAX_AGE is the maximum age allowed an RSP. The parameter "n" is defined in FIG. 7.

Rule 9(A). When a node propagates an RSP, it does not do so immediately upon receipt of the incoming RSP. The reader is reminded that propagation, in effect, copies an RSP from the node's status table. That RSP in the status table may be a copy of an accepted incoming RSP, as in Rule 5(E), or may be a copy of a previously accepted RSP, as in Rule 5(F). In the latter case, the propagated copy was induced by an incoming RSP which was discarded.

Thus, propagated RSPs are copied from a status table. If propagation is to occur, the propagating node sets a flag within the RSP of the status table. FIG. 2 illustrate a FLAG column, where the flags are set. The flagged RSPs are, in effect, queued for propagation, on a First-In-First-Out, FIFO, basis. That is, the earliest-flagged RSP is propagated first, followed by the next, and the next, and so on.

However, a delay of Tt, throttling time, is imposed between the propagations. Thus, if the queue contains ten flagged RSPS, after the first is propagated, a time of 9(Tt) is required to complete the propagation process.

Rule 9(B). As Rule 9(A) stated, throttling time Tt refers to a time delay imposed between successive propagations by propagating nodes. A somewhat similar time delay is imposed, but at the originating node. This delay is TMAXF. The "F" refers to "flooding." A similar minimum delay TMINP is imposed.

Thus, an RSP, after generation by the originating node, may be required to wait until TMINF expires, before it is propagated. It must be propagated before, or when, TMAXF expires.

Rule 10. This rule concerns constraints on timing parameters.

Rule 10(A). Delay Ttr, discussed in Rule 7, is greater than the maximum total possible delay for a data packet's route. That maximum delay includes link delay, which is the time spent on a link, and propagation delay, which is the time between (1) arrival and (2) departure at a node. The maximum possible delay is the transit time, from start to finish, for the longest possible route in the network.

Rule 10(B). The time MAX_AGE, which is the maximum age allowed to an RSP, is preferably about 20 minutes, but any suitable age can be selected, depending on the properties of the RSP desired.

Rule 10(C). Time TMAXF, given in Rule 9(B), should be at least $(2N-1)(Tt)$, wherein N is the number of nodes in the network and Tt is the throttling time of Rule 9(A).

Rule 10(D). Time Tt, the throttling time of Rule 9(A), must not be less than the time for an RSP to traverse the network. "Traverse" means to reach all nodes, once launched from the originating node.

Rule 11. Each node must be connected to the network by a minimum of two links. For example, if two networks were connected to each other by a single link, sometimes called a "gateway," in violation of this rule, then if that link failed, one network could not flood the other with RSPs, because the only connection between the networks had failed.

Selected Properties of a Network Which Follows the Rules

Termination of Flooding

A simplifying assumption will be made, namely, that all RSPs reside within the status tables. That is, it is assumed that no RSPs exist "in transit." This simplification is justified on the ground that the transit time between nodes is very short. This simplification facilitates the explanation of termination of flooding.

If a node originates an RSP, and then receiving nodes copy it and propagate it, flooding would continue forever, because no node would ever discard the RSP. Eternal flooding is not desired, and eventual termination is sought.

Termination is facilitated by several rules. One is Rule 5(C), under which a redundant RSP is discarded. In effect, after an RSP has served its purpose, nodes begin to discard its later-arriving copies.

A second is Rule 5(B), wherein older RSPs are discarded in favor of newer RSPs.

A third is the collective action of rule 5(E) and a combination of others. Under Rule 5(E), when an RSP arrives which has reached age zero, it is nevertheless propagated. When the originator receives that propagated age-zero copy, the originator will discard it under Rule 5(I). The originator will also issue a fresh RSP. The fresh RSP will possess a higher sequence number than all stored RSPs (unless an error occurs). Flooding of the fresh RSP will displace the stored RSPs, including those of zero age, which were accepted and stored under Rule 5(E).

Thus, the invention causes a combination of (1) continual expiration and discarding of the expired RSPs, and (2) replacement of them by newer RSPs. The newer RSPs themselves (1) continually expire and are discarded and (2) are replaced by yet newer RSPs.

Prompting Recovered Node as to Sequence Number

Prior to a specific hypothetical time T (not shown in any Figures), a given node may be inoperative. After that time T, the node may come into operation. Two examples of this occur when (1) a new node, previously non-existing, is added to the network, and (2) a previously existing node crashed before time T, and returns to operation at time T. Such nodes will be called "new" nodes.

The new node needs to know what sequence number to assign its RSPs. This new node is prompted as to the appropriate sequence number by Rule 8H. If the new node is literally new, so that no variable "X" is available, then "X" is zero, by default.

Error Correction

In general, when erroneous data is detected, as by detecting a failure to match a checksum, the data is discarded. The continuing processes described above are allowed to correct the error, by issuance of fresh RSPs.

Time Complexity

A model is described in "Concurrent Broadcast for Information Dissemination," by D. M. Topkis, IEEE Trans. Sort. Eng., vol. SE-H, no. 10, pp. 1107–1112, October, 1985, which is called the Topkis Model. Under the Topkis Model, a situation is assumed, namely, that K nodes report changes in status of links, and M nodes are functional. Under the Topkis Model, the time complexity of the flooding process will be close to M(Tt) and will not be greater than (K+M−1)Tt, wherein Tt is the throttling time of Rule 7.

Also, under the Topkis Model, the largest time complexity occurs when M=K=N, that is, when the number of links equals the number of operative nodes, and that number of nodes equals the total number of nodes in the network. Restated, all nodes are operative, and the number of links equals the number of nodes. In this case, the time complexity is between N(Tt) and (2N−1)Tr.

These time complexities explain the origin of the limit on the throttling time, Tt, in Rule 10(D).

Additional Considerations

1. Under the invention, the parties receiving the RSPs do not acknowledge receipt of the RSP. Acknowledgement can be illustrated by an example.

Consider node A, which periodically examines its links for changes in status, as described above. Node A is equipped with a list of other nodes, which node A is to notify when a change in link status is detected. This list may contain all other nodes in the network, or a subset of those nodes.

When node A detects a change in status, it sends a message to every node on the list. When each node receives the message, it sends an acknowledgement to node A. The acknowledgement identifies the message received from node A, as by stating, for example, "Node received node A's message of 10:00 am, on Jun. 3, 1999."

Thus, the acknowledgement (1) informs node A that a message was received, and (2) identifies the specific message. The latter step can be important if node A sends more than one message.

Node A lists the acknowledgements received, and compares that list with the list of nodes. If the comparison indicates that an acknowledgement has not been received from a particular node, then node A repeats the notification until either (1) acknowledgement is received from the delinquent node, or (2) a predetermined number of notifications of the delinquent node has been made.

In contrast to the exemplary procedure just described, the invention does not utilize acknowledgements. One reason is to reduce the bandwidth which the acknowledgements would consume.

One result of the elimination of acknowledgements is that, under the invention, the flooding is done "open loop." That is, no feedback is necessarily received by an originating node, indicating that all other nodes have received its RSPs. Instead, it is assumed that the collective operation of the rules described above serves to accomplish the goal of the feedback, namely, assuring that all nodes receive the RSP.

It is recognized that, in certain cases, a type of feedback may be received from a few nodes. For example, the collaborative action of Rules 5(E) and (I), in effect, inform an originating node that at least one other node has received the originator's RSP. However, this is a very limited type of feedback. For example, the identity of the recipient-node(s) is not specified. Also, the actual number of nodes which received the RSP is not specified either.

2. The process described in Additional Consideration number 1 utilizes "self-propagating" messages. Those messages may be used exclusively. A "self-propagating" message is one which lacks a stated destination, and which is flooded, as described above, when received by a node. In contrast, an ordinary message contains a destination address, and its travel terminates when it reaches the address.

Further, a node detecting a change in a link spreads news of that change exclusively by issuing such self-propagating messages. That is, the node does not receive acknowledgements and then issue additional messages to non-acknowledging nodes. The node may later issue additional messages, as under Rule 5(I). However, those messages are self-propagating. Further still, the collective operation of the rules causes the messages to be self-terminating. For example, under Rule 5(D) certain incoming RSPs are discarded. That discarding removes them from circulation, and is part of the self-termination process. The RSPs are "self-terminating" because the decision to terminate, while made by a node, is based on information contained within the RSP.

Numerous substitutions and modifications can be undertaken without departing from the true spirit and scope of the invention. What is desired to be secured by Letters Patent is the invention as defined in the following claims.

What is claimed is:

1. A method of operating a packet-switched network, comprising the following steps:

a) at each node, repeatedly examining status of links connecting to the node; and b) if a change in status is detected by a node, flooding the network with news of the change in messages which are self-propagating and self-terminating; and c) if a node detects no change in status of a link for a predetermined interval T2, then flooding the network with news of the status existing at time T2.

2. Method according to claim 1, and further comprising repetition of the steps of paragraphs (a) and (b) after that of paragraph (c).

3. A method for use with a base node within a network, comprising:

a) maintaining a status table which indicates operational status of data links in the network;

b) testing operability of data links connected to the base node;

c) if testing indicates a data link DEF connected to the base node is defective,
   i) generating a new Route Status Packet, RSP, which identifies
      A) identifies the defective data link DEF,
      B) identifies the base node as originator of the new RSP,
      C) contains an initial age of the RSP, and
      D) contains a sequence number of the RSP; and
   iii) transmitting copies of the new RSP to all neighbors of the base node, but not using data link DEF.

4. Method according to claim 3, and further comprising:

d) if an incoming RSP originating from another node N is received at the base node,
   i) comparing the incoming RSP with previous RSPs received from node N, and
      A) if the incoming RSP has a sequence number exceeding that of a previous RSP received from node N, then
         1) accepting the incoming RSP, and
         2) using data in the incoming RSP to update the status table;
      B) if the incoming RSP has a sequence number which does not exceed that of a previous RSP received from node N, discarding the incoming RSP.

5. Method according to claim 4, and further comprising:

e) using data in the incoming RSP to update the status table, f) decrementing age of the RSP, and g) transmitting copies of the age-decremented RSP onto links leading from the base node.

6. Method according to claim 4, and further comprising:

e) receiving an incoming RSP at the base node; and f) ascertaining whether the incoming RSP received is a copy of an RSP previously originated by the base node and, if so, discarding the RSP.

7. Method according to claim 4, and further comprising:

e) at the base node, queuing data packets which would be transmitted over the defective data link DEF, while data link DEF is defective.

8. Method according to claim 7, and further comprising:

f) when the base node receives information indicating that data link DEF is operational, transmitting the queued data packets onto data link DEF.

9. Method according to claim 8, and further comprising:

g) updating the status table at the base node, to indicate correct status of data link DEF.

10. Method according to claim 7, and further comprising:

f) for packets in the queue, generating substitute routes using operational links, and initiating a process of emptying the queue, using the substitute routes.

11. A system, comprising:

a) a packet-switched network having nodes;

b) means at each node for repeatedly examining status of links connecting to the node, and
   i) if a change in status is detected by the means, flooding the network with news of the change in messages which are self-propagating and self-terminating, and
   ii) if the means detects no change in status of a link for a predetermined interval T2, then flooding the network with news of the status existing at time T2.

12. Apparatus according to claim 11, wherein the steps of paragraphs (a) and (b) are repeated after that of paragraph (c).

13. Apparatus for use with a base node within a network, comprising:

a) means for maintaining a status table which indicates operational status of data links in the network;

b) means for testing operability of data links connected to the base node, and
   i) if testing indicates a data link DEF connected to the base node is defective,
      A) generating a new Route Status Packet, RSP, which
         1) identifies the defective data link DEF,
         2) identifies the base node as originator of the new RSP,
         3) contains an initial age of the RSP, and
         4) contains a sequence number of the RSP; and
      B) transmitting copies of the new RSP to all neighbors of the base node, but not using data link DEF.

14. Apparatus according to claim 13, and further comprising:

c) means for detecting whether an incoming RSP originating from another node N is received at the base node, and, if so,
   i) comparing the incoming RSP with previous RSPs received from node N, and
      A) if the incoming RSP has a sequence number exceeding that of a previous RSP received from node N, then
         1) accepting the incoming RSP, and
         2) using data in the incoming RSP to update the status table; and
      B) if the incoming RSP has a sequence number which does not exceed that of a previous RSP received from node N, discarding the incoming RSP.

15. Apparatus according to claim 14, and further comprising means for:

d) using data in the incoming RSP to update the status table, e) decrementing age of the RSP, and f) transmitting copies of the age-decremented RSP onto links leading from the base node.

16. Apparatus according to claim 14, and further comprising means for:

d) receiving an incoming RSP at the base node; and e) ascertaining whether the incoming RSP received is a copy of an RSP previously originated by the base node and, if so, discarding the RSP.

17. Apparatus according to claim 14, and further comprising:

d) means located at the base node, for queuing data packets which would be transmitted over the defective data link DEF, while data link DEF is defective.

18. Apparatus according to claim 14, and further comprising:
d) means for transmitting the queued data packets onto data link DEF when the base node receives information indicating that data link DEF is operational.

19. Apparatus according to claim 15, and further comprising:

g) means for updating the status table at the base node, to indicate correct status of data link DEF.

20. Apparatus according to claim 14, and further comprising:
d) means for generating substitute routes using operational links for packets in the queue, and initiating a process of emptying the queue, using the substitute routes.

* * * * *